United States Patent [19]
Kishi et al.

[11] Patent Number: 5,410,486
[45] Date of Patent: Apr. 25, 1995

[54] NAVIGATION SYSTEM FOR GUIDING VEHICLE BY VOICE

[75] Inventors: Hiroshi Kishi, Toyota; Toru Ito, Nagoya; Shoji Yokoyama, Anjo; Kyomi Morimoto, Nishio; Kenji Kuroda, Sabae, all of Japan

[73] Assignees: Toyota Jidosha K.K., Toyota; Aisin Aw Co. Ltd., Anjo, both of Japan

[21] Appl. No.: 92,816

[22] Filed: Jul. 19, 1993

[30] Foreign Application Priority Data

Jul. 20, 1992 [JP] Japan ................................. 4-192527
Jul. 31, 1992 [JP] Japan ................................. 4-204729

[51] Int. Cl.⁶ .......................................... G06F 15/50
[52] U.S. Cl. ................................. 364/449; 364/444; 340/990; 340/995
[58] Field of Search ....................... 364/443, 444, 449; 73/178 R; 340/988, 990, 995

[56] References Cited

U.S. PATENT DOCUMENTS

| | | | |
|---|---|---|---|
| 4,635,202 | 1/1987 | Tsujii et al. | 364/449 |
| 4,774,671 | 9/1988 | Itoh et al. | 364/449 |
| 4,812,845 | 3/1989 | Yamada et al. | 364/449 |
| 4,882,696 | 11/1989 | Nimura et al. | 364/449 |
| 4,937,751 | 6/1990 | Nimura et al. | 364/449 |
| 5,184,123 | 2/1993 | Bremer et al. | 364/449 |

FOREIGN PATENT DOCUMENTS

| | | |
|---|---|---|
| 3925057 | 1/1991 | Germany . |
| 62-267900 | 11/1987 | Japan . |
| 1173815 | 7/1989 | Japan . |
| 1173817 | 7/1989 | Japan . |
| 24285 | 1/1990 | Japan . |
| 2103584 | 4/1990 | Japan . |
| 3137679 | 6/1991 | Japan . |
| 3269317 | 11/1991 | Japan . |
| 41897 | 1/1992 | Japan . |
| 41898 | 1/1992 | Japan . |
| 414400 | 3/1992 | Japan . |

OTHER PUBLICATIONS

DE-Z-ELO Jul. 1984 Seiten pp. 20-26.
"Electro Multivision-Voice Navigaton System", Toyota Technical Review vol. 43 No. 1 May 1993.
H. Kishi et al, Human Factors Considerations for Voice Route Guidance, Toyota Motor Corp. pp. 98-109.
T. Ito et al, Development of New Navigation System—Voice Route Guidance, Toyota Motor Corp and Aisin AW Co., Ltd.

*Primary Examiner*—Gary Chin
*Attorney, Agent, or Firm*—Cushman, Darby & Cushman

[57] ABSTRACT

A vehicle navigation system for orally issuing route guidance, capable of changing a point at which the route guidance is issued depending on the moving situation of a vehicle. The moving situation is at least one of a number of lanes in a road being traveled, a width of a crossroad intersecting the road being traveled and a speed of the vehicle. The moving situation is detected by a moving situation detector section and based on the detected moving situation, the route guidance issuing point is changed to the optimum point for the moving situation at that time by a guidance issuing point changer of a route guide controller.

9 Claims, 4 Drawing Sheets

NAVIGATION SYSTEM FOR GUIDING VEHICLE BY VOICE

BACKGROUND OF THE INVENTION i) Field of the Invention

The present invention relates to a navigation system mounted to a vehicle for guiding a vehicle such as a car according to a predetermined route, and more particularly to a vehicle navigation system for orally informing a driver of a route selected.

ii) Description of Related Art

Conventionally, in order to reduce a driver's load, a variety of devices have been proposed and mounted to a vehicle and a navigation system for guiding a vehicle to a destination along a route is known. In this navigation system, when the vehicle passes through a branch point such as an intersection, a selected route is advised to a driver. In an example of a navigation system put to a practical use, an image display device using a display is provided on an instrument panel of the vehicle and a route is informed to the driver.

In addition to the information by use of the image display, another navigation system for issuing route information orally has been known. For example, as disclosed in Japanese Patent Laid-Open No. Sho 62-267900, in a navigation system, when the vehicle has reached a predetermined position (30 m) before an intersection, in order to give route information, an indication is given to the driver orally. In such a navigation system, by using a voice there is no need for the driver to look at a display and he can concentrate on looking ahead.

However, in the conventional navigation system, the point at which a guiding voice is spoken is fixed to a predetermined distance before an intersection. Thus, when moving on a road having many lanes, sometimes, a lane change can not be completed before reaching the intersection and hence a right-hand turn or a left-hand turn can not be carried out.

For example, when the voice speaks "turn to the right at the next intersection" while the vehicle is moving in the leftmost lane, it is necessary to adapt the driving to the flow of surrounding vehicles and to carry out a lane change to the rightmost lane and sometimes it can take a substantial amount of time to effect this lane change. Further, in the case of a road having many lanes, in many cases, a right-hand turn only lane is provided, and when turning to the right, it is required to align the vehicle at the rear of the vehicle row which has formed in the right-hand turn only lane. This has been described in connection with countries where cars drive on the left-hand side of the road. A turning-right only lane of this case corresponds to a turn left only lane of the road in countries where cars drive on the right side, however this is not necessarily so. In this case, it is often necessary to complete the lane change a considerably long time before the intersection. In such a case, the driver needs to know the route change at the intersection earlier.

Further, in the conventional navigation system, the point at which the guide voice is spoken is fixed to the predetermined distance before the relevant intersection and the distance from the intersection is in fact the distance measured from the center of the intersection. Hence, in the case of a crossroad having a wide width in the running direction of a vehicle, a difference between a distance from the center of an intersection and a distance from the entrance of the intersection becomes large. For the driver, the distance to the entrance of the intersection is the necessary information, and, when the navigation is performed based on the central position of the intersection, the vehicle can reach the intersection earlier than he estimated due to the error caused by the aforementioned road width. For example, as shown in FIGS. 1A and 1B, a distance $L_C$ from a vehicle 1 to the center 2 of an intersection is not equal to a distance $L_E$ from the entrance 3 of the intersection and the distance $L_E$ varies depending on a width (in the vehicle running direction) of a crossing road intersecting with a road where the vehicle runs. FIG. 1A illustrates the intersection with a crossroad having a wide width in the running direction of the vehicle and FIG. 1B illustrates the intersection with a crossroad with a narrow width in the running direction of the vehicle. As shown in FIGS. 1A and 1B, even when the distance $L_C$ from the vehicle to the center 2 of the intersection is equal, a distance $L_{E1}$ from the vehicle to the entrance 3 of the intersection as shown in FIG. 1A is shorter than a distance $L_{E2}$ from the vehicle to the entrance 3 of the intersection as shown in FIG. 1B ($L_{E1} < L_{E2}$). Hence, when the width of the crossroad is wide, actually, the distance to the entrance 3 of the intersection from the point of voice guidance becomes shorter and thus sometimes the right-hand or left-hand turning chance is missed.

Further, in the conventional navigation system wherein the guiding point is fixed, when the running speed of the vehicle is different, the time of reaching the relevant branch point is different. That is, in the case of a fast running speed, the vehicle approaches the intersection relatively quickly and in the case of the low running speed, the vehicle approaches the intersection relatively slowly. Hence, when the vehicle runs at a fast speed, the vehicle can approach the intersection more quickly than the driver expected.

In particular, in the case of carrying out an oral guide of the vehicle, if the voice guidance is not completed, the informing is not substantially executed, and in the conventional navigation system, before the oral guide finishes informing, the vehicle may pass the intersection.

SUMMARY OF THE INVENTION

It is therefore an object of the present invention to provide a vehicle navigation system in view of the above-described problems of the prior art, which is capable of changing the point at which navigation information is orally issued depending on which a lane number in road the vehicle is currently occupying.

It is another object of the present invention to provide a vehicle navigation system which is capable of changing the point at which navigation information is orally issued depending on the width of a crossroad intersecting with a road where the vehicle is running.

It is a further object of the present invention to provide a vehicle navigation system which is capable of changing the point at which navigation information is orally issued depending on the running speed of the vehicle.

In order to achieve the aforementioned objects, a navigation system for a vehicle according to the present invention includes means for detecting the running situation of the vehicle. The navigation system includes means for calculating a guide point of executing a route guide depending on the running situation detected by the detecting means. The calculating means of the guide point calculates whether of not it is proper to execute a voice guide depending upon how fast the vehicle approaches a branch point, that is, an intersection, and calculates this point as the point at which to execute the voice guide. At this time, the point of the oral guidance is preferably calculated as the point where the oral guidance is completed, and thus the starting point of the oral guidance can be calculated on the basis of the length of the guide content of the guidance to be informed at that time.

The running situation detected is at least one of a lane number in a road currently occupied, a road width of a crossroad intersecting with the road of running, and the current running speed of the vehicle. When the guide position is calculated on the basis of the lane number in the road currently occupied, the guidance is issued further away from the branch point as the lane number increases. Hence, the driver can execute the lane change with sufficient margin before reaching the beginning of the intersection.

Also, when the guidance point is calculated on the basis of the road width of the cross road, the guidance is executed at a point further away from the branch point as the road width of the cross road enlarges. Thus, the shift between the center of the intersection and the entrance of the intersection is corrected and reaching the entrance of the intersection ealier than the driver expected can be prevented.

Also, when the guide point is calculated on the basis of the running speed of the vehicle, the guidance is issued at a point further away from the branch point as the speed increases. Accordingly, the time from being guided to reaching the intersection may not differ largely depending on the speed difference. Preferably, depending on the speed difference detected, the distance between the guide completion point and the guide start point is changed. That is, in case of the high speed, even when the guide of the same content is executed, by starting the guide from the point farther away from the intersection, the guide can be completed at almost the same point.

Further, these can be properly used in combination. For example, in the case of the detection of the lane number in the road currently occupied and the speed of the vehicle, when the speed is high, it is possible to determine the guide point to be further away from the intersection than the guide point calculated using only the lane number.

The above-described calculation of the guide point involves the detection of the running situation and the calculation of the proper position depending on the position of the intersection and the running situation. However, it can be a calculation by correcting the predetermined guide point depending on the running situation. That is, when the route to the destination is determined and the intersection to be an object of the guiding is selected, the position of a predetermined distance before the intersection can be stored as the guide point and the stored guide point can be changed depending on the running situation can be changed.

As described above, according to the present invention, depending on the running situation such as the lane number in the road currently occupied, the road width of the crossroad, and the speed of the vehicle, the guide point is calculated and thus the information of the next branch point can be precisely given to the driver.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 2:
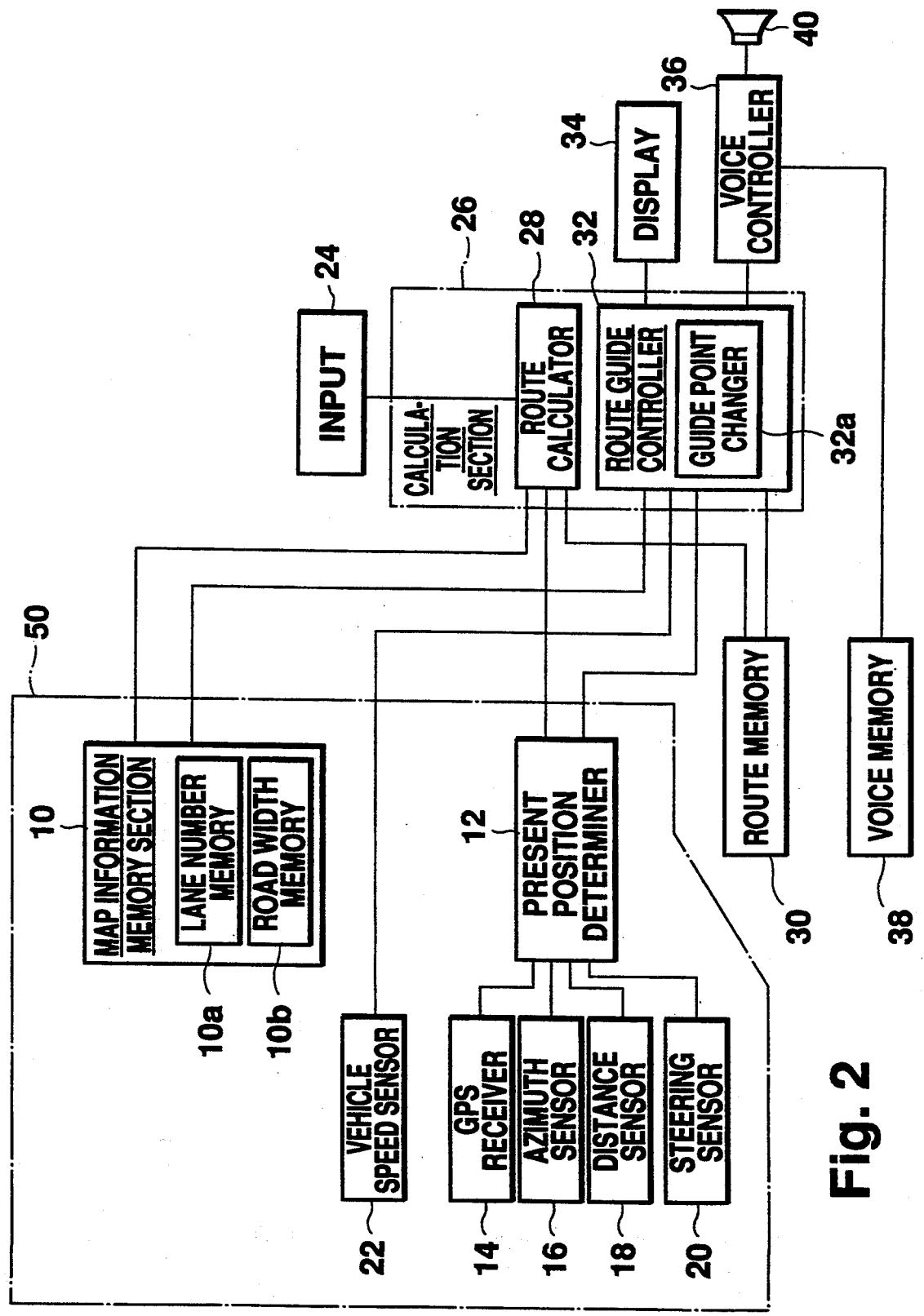
FIG. 2 is a block diagram of a vehicle navigation system according to the present invention.

Referring now to the drawings, wherein like reference characters designate like or corresponding parts throughout the views and thus the repeated description thereof can be omitted for brevity, there is shown in FIG. 2 one embodiment of a vehicle navigation system according to the present invention.

As shown in FIG. 2, in the vehicle navigation system, a map information memory section 10 having a lane number memory 10a and a road width memory 10b for storing map information of roads, place names, building names, river names and the like is provided and the map information is read out of the map information memory section 10 as required. The vehicle navigation system also includes a GPS (Global Positioning System) receiver 14 utilizing the GPS for measuring a present position of a vehicle, an azimuth sensor 16 for detecting a running azimuth of the vehicle based on the earth's magnetism, a distance sensor 18 for detecting the running distance of the vehicle from the revolution speed of the wheel, and a steering sensor 20 for detecting a steering revolution angle. On the basis of the detection result of these sensors, a present position determiner 12 determines the present position of the vehicle. The vehicle navigation system also includes a vehicle speed sensor 22 for detecting the speed of the vehicle. As is well-known, the vehicle speed sensor 22 can operate together with the distance sensor 18 and in this case, by detecting the revolution speed of the wheel, the vehicle speed can be detected.

The vehicle navigation system also includes an input part 24, a calculation section 26 having a route calculator 28 and a route guide controller 32, a route memory 30, a display 34, a voice controller 36, a voice memory 38 and a speaker 40. The route guide controller 32 includes a guide point changer 32a.

When navigation of a vehicle to a destination is carried out, first, the destination is displayed on the screen of the display 34 or is input by a place name or the like by means of the input part 24. A route from the present position calculated by the present position determiner 12 to the destination is calculated by the route calculator 28 included in the calculation section 26, and the calculated route is stored in the route memory 30. After the input of the destination and the determination of the route, actual navigation of the vehicle is performed. The route guide controller 32 of the calculation section 26 reads the map information of the area around the vehicle out of the map information memory section 10, and the map information is overlapped with the present vehicle position, the running direction and the route stored in the route memory 30, and this overlapped result is displayed.

Figure 3:
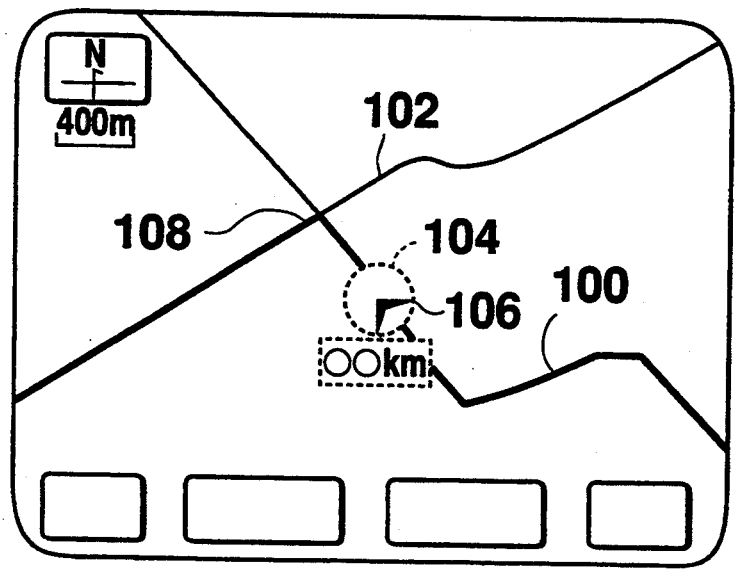
FIG. 3 is a schematic view of a display of a route in the vehicle navigation system shown in FIG. 2.

The display 34 is provided within a instrument panel near the driver's seat, and the driver confirms the position of the vehicle by looking at the display 34 and obtains information about the future route. One example of the display is shown in FIG. 3. In FIG. 3, the selected route is shown by a thick solid line 100 and other roads are shown by thin solid lines 102. The position of the vehicle is shown by a circle 104 and the running direction is indicated by a wedge-shaped arrow 106. The display of the roads can be distinguished by different colors in addition to the separation by line thickness.

Figure 4:
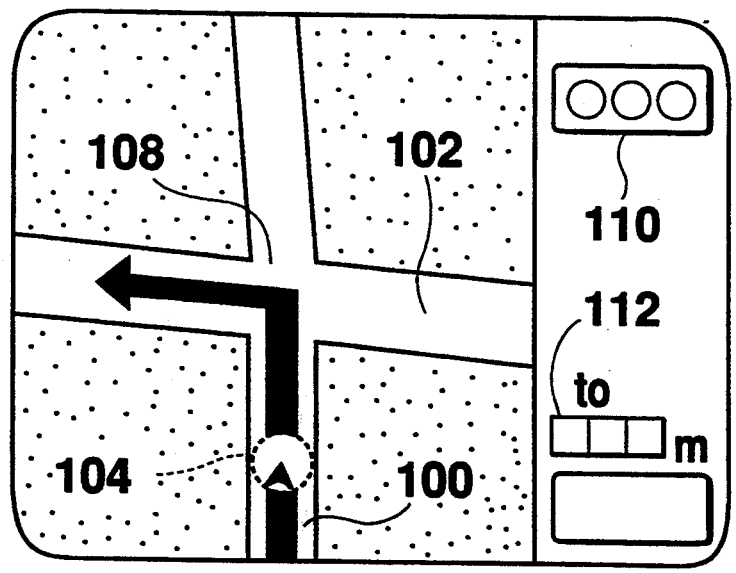
FIG. 4 is a schematic view of a display showing an enlarged map near a road intersection for a left-hand or right-hand turn in the vehicle navigation system shown in FIG. 2.

When the vehicle approaches an intersection 108 where a route is to be changed, the display screen is changed as shown in FIG. 4 and an intersection name 110 and a distance 112 to the intersection 108 are shown on the display 34. Also, at the same time as this display change, the route guide controller 32 instructs the voice controller 36 to generate the voice corresponding to the navigation action at the intersection 108. The voice controller 36 reads the information stored as digital data stored in the voice memory 38 and converts the digital data into analog signals to drive the speaker 40. Then, from the speaker 40, the navigation of the route indication is instructed to the driver, for example, the voice says "turn to the left at the next intersection". This voice instruction is repeated at predetermined points until the vehicle passes through the intersection 108.

At this time, when there are many lanes in the road and the vehicle is positioned in the rightmost lane, first, it is necessary to perform a lane change to the leftmost lane. In order to allow the time required for the lane change, the navigation instruction should be given earlier. In the navigation system of the present invention, the map information memory section 10 includes the lane number memory 10a for storing the lane numbers within the information concerning the roads stored in the map information memory section 10. When reading out the map information, the route guide controller 32 also reads out the information of the lane number at the same time and the driver can always be aware of the number of lanes in the road where the vehicle is. The guide point changer 32a included in the route guide controller 32 gives an instruction for changing the point of executing the route guide, that is, the distance to the relevant intersection depending on the lane number. For example, when driving on a road having one lane on one side, the voice guidance is carried out at a position 350 m before the intersection, and for every one lane increase, the position of issuing the voice guidance is further extended by 100 m in a direction opposite to the direction of vehicle travel. That is, in a road with two lanes, the voice guide position is determined to be 450 m before the intersection and in a road with three lanes, 550 m before the intersection. Also, the enlarged view of the relevant intersection should be displayed earlier. In this embodiment, the above-described voice guidance is first executed and the display change from the route display to the enlarged view display is adapted to be simultaneously carried out.

In this embodiment, as described above, even when the vehicle travels on a road with a plurality of lanes, where the lane change is required for the execution of a left-hand or right-hand turn, the lane change can be suitably carried out earlier and the missing of the left-hand or right-hand turn timing can be prevented.

Further, the information as to whether or not there is a right-hand turn only lane at the intersection is included in the road information and earlier route guidance can be issued. As a result, a situation where the driver must attempt to squeeze his vehicle into a row of vehicles aligned in the right-hand turn lane can be prevented.

In the navigation system, when the position for issuing the route guidance is determined, the width of a crossroad intersecting the road where the vehicle travels is also considered. The map information memory section 10 also includes the road width memory 10b for storing the number of lanes in the road. From the present position of the vehicle obtained by the present position determiner 12 and the information of the map information memory section 10 including the road width memory 10b, the route guide controller 32 detects the width (in the direction of coming vehicle) of the crossroad intersecting the road where the vehicle travels. In this case, by multiplying the lane number by a predetermined value, the width of the crossroad is obtained. Hence, the contents of the information to be stored can be used in common with the lane number memory 10a and thus the amount of memory used can be reduced. Of course, the road information and actual widths can be stored together and based on these data.

The guide point changer 32a of the route guide controller 32 instructs a change in the point for executing the route guidance depending on the number of lanes the crossroad has. For example, by considering the entrance 3 of the intersection (see FIG. 1A), based on the value obtained by subtracting half of the width of the crossroad from the distance between the vehicle and the center 2 of the intersection, the point at which the route guidance is issued is calculated. In this embodiment, assuming that the width is 3 m for one lane, the road width is calculated, and, when the crossroad intersecting the road where the vehicle travels is a road having one lane on one side, the voice guidance is carried out at a position 350 m before the center of the intersection. Every one lane increase, the position for carrying out the voice guidance is further extended by 3 m to the vehicle side away from the intersection. Also, the enlarged view of the relevant intersection should be displayed earlier. In this case, the above-described voice guidance is first performed and the display change from the route display to the enlarged view display is adapted to be simultaneously carried out.

Therefore, in the navigation system, as described above, the route guidance can be issued depending on the width of the crossroad, and, even when the width of the crossroad is wide, a delay in issuing of the route guidance and an earlier approach to the relevant intersection than the driver estimated can be prevented.

Figure 1A:
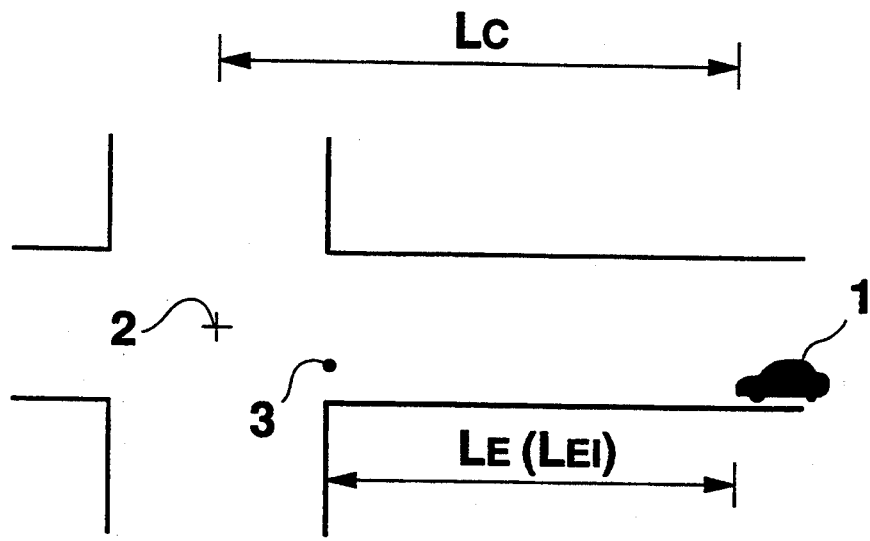
FIG. 1A is a schematic view showing a crossroad having a wide width in a running direction of a vehicle for explaining the error of the distance to an entering point of an intersection depending on the road width.
Figure 1B:
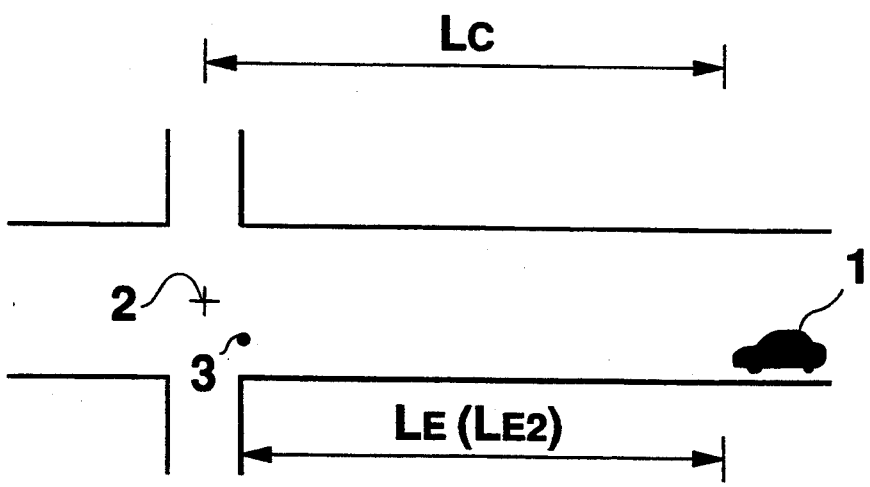
FIG. 1B is a schematic view showing a crossroad having a narrow width in the running direction of the vehicle for explaining the error of the distance to the entering point of an intersection depending on the road width.

Further, in the navigation system, although the route guidance is carried out on the basis of the entrance 3 of the intersection as shown in FIG. 1A, it is assumed that the stop line is positioned 3 m before the entrance 3 of the intersection and this stop line can be considered as the reference point.

Although the roads cross each other at right angles in the above described embodiment, the position for executing the route guidance can be changed depending on an intersection angle of the roads. When the intersection angle of the roads is small, the distance between the center and the entrance part of the intersection becomes long. That is, in the same manner as the crossroad having the wide width, the difference between the distance to the center of the intersection and the distance to the entrance of the intersection becomes large. Hence, the intersection angle of the road can be suitably considered. In this case, when the vehicle approaches the intersection, the intersection angle of the road at the intersection is calculated on the basis of the information concerning the roads stored in the map information memory section 10 and, when the obtained intersection angle is small, the route guidance issuing position is elongated away from the intersection in the direction opposite to the direction of vehicle travel. Hence, the navigation system can deal with the intersection having the small intersection angle of the roads.

Further, in the navigation system, the guidance issuing point can be changed depending on the present speed of the vehicle. The speed of the vehicle is detected by the vehicle speed sensor 22 and based on the detected speed, the guidance issuing point changer 32a changes the guidance issuing point. In general, it is controlled so that as the speed becomes higher, the guidance is given at a point further away from the relevant intersection. When the guidance is always issued at a fixed distance away from the intersection, in the case of the high speed running, the vehicle can quickly approach the intersection. More specifically, in the case of a speed less than 50 km/h, the guidance issuing point change can not be performed and the guidance is issued at a position determined by another condition. In the case of a speed of at least 50 km/h and less than 70 km/h, the guidance issuing position is changed to extend 100 m in the direction of the vehicle, away from the intersection, and in the case of a speed of at 70 km/h or more, the guide position is further elongated by 100 m in the direction of the vehicle, away from the intersection.

As will be apparent from the above description, the map information memory section 10, the present position determiner 12 and the sensors 14 to 22 constitute a running situation detector section 50. The information relating to the guidance issuing point change is collected by the running situation detector section 50 and on the basis of the collected information, the guidance issuing point changer 32a executes a proper change of the guidance issuing point.

Figure 5:
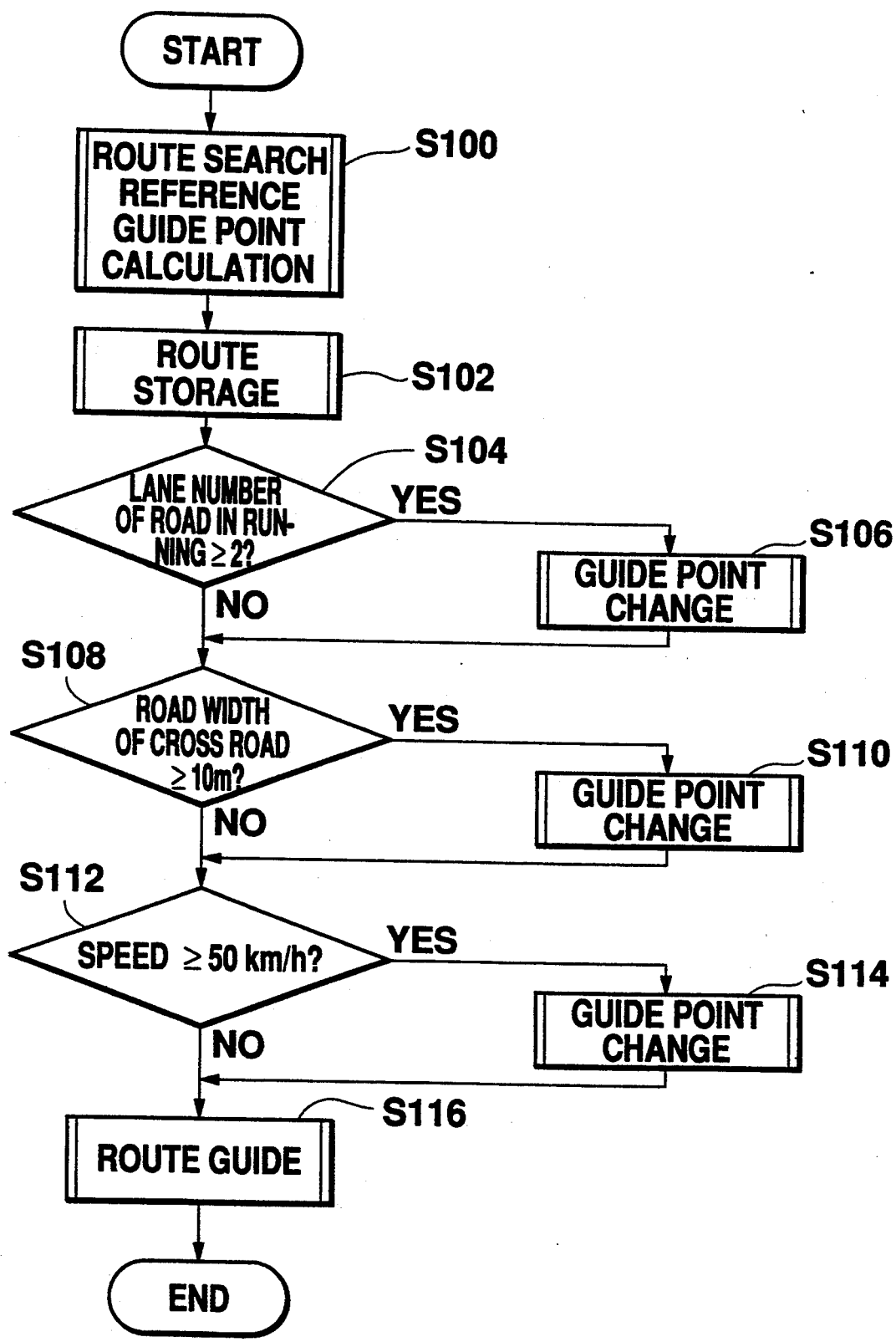
FIG. 5 is a flow chart showing a control of a guide point change in the vehicle navigation system shown in FIG. 2.

As described above, in the navigation system, the position for carrying out the route guidance is determined on the basis of the number of lanes in the road where the vehicle travels, the width of the crossroad ahead and the present running speed of the vehicle. For determining the guidance issuing point, finest, the position to be the reference at the route search time is calculated and then the reference guidance issuing point is corrected based on the aforementioned running situation to change the guidance issuing point. In FIG. 5, there is shown a flow chart of a method for determining the guidance issuing point. In step S100, a route search from a start point to a destination point is carried out. At this time, points requiring route guidance such as intersections for left-hand or right-hand turn are stored as branch points. Further, the points where the route guidance is issued are calculated. For example, a point 300 m before a relevant intersection is calculated as a reference point of the route guide. In step S102, the route information including this reference guide point is stored.

In step S104, it is determined whether or not there is at least a predetermined number (for example, two) of lanes in the road currently being driven down. When there is at least the predetermined number (two) of lanes in the road, the guidance issuing point change is carried out so that the guidance can be issued before the reference guide point stored in step S106. The guidance issuing point is changed so as to be shifted more away from the relevant intersection in the direction of the vehicle as the number of lanes increases. Further, in step S108, the road width of the cross road ahead is detected, and in the case of the road width of at least a predetermined value (for example, 10 m), the guidance issuing point change is performed depending on the width of the crossroad in step S110. Further, in seep S112, the running speed of the vehicle is detected and, when the speed is at least a predetermined value (for example, 50 km/h), the guidance issuing point change is carried out in step S114. Next, in step S116, the route guidance is issued at the position which is changed depending on the running situation to give the route information to the driver.

As described above, in the navigation system, first, the reference guide point is calculated regardless of the running situation of the vehicle, and then a control is performed to correct the reference guide point and to issue the route guidance. However, since the information relating to the number of lanes in the road and the width of the crossroad intersecting the road being traveled down can be decided at the route search time, when storing the route information the guidance issuing positions changed in consideration of the information are also stored, and so the route guidance can be suitably issued. In this case, when driving, only the change based on the current vehicle speed needs to be executed.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A navigation system for issuing a route guidance for a vehicle orally as voice guidance, said system comprising:

means for storing route information required to reach a destination, said route information including information of a branch point on a road being traveled by said vehicle to be an object of said voice guidance;

means for detecting a number of lanes of said road being traveled;

means for calculating a position for issuing said voice guidance before said vehicle reaches said branch point in accordance with said detected number of lanes, said calculating means calculating said position for issuing said voice guidance at a position which is increasingly further away from said branch point as said detected number of lanes increases; and means for issuing said voice guidance at said position for issuing said voice guidance.

2. A navigation system for issuing a route guidance for a vehicle orally as voice guidance, said system comprising:

means for storing route information required to reach a destination, said route information including information of a branch point on a road being traveled by said vehicle to be an object of said voice guidance;

means for detecting a width of a crossroad intersecting said road being traveled at said branch point;

means for calculating a position for issuing said voice guidance before said vehicle reaches said branch point in accordance with said detected width of said crossroad, said calculating means calculating said position for issuing said voice guidance at a position which is increasingly further away from said branch point as said detected road width increases; and means for issuing said voice guidance at said position for issuing said voice guidance.

3. A navigation system according to claim 2, wherein said width of said crossroad is calculated on a basis of a number of lanes in said crossroad.

4. A navigation method for carrying out a navigation of a vehicle utilizing a voice guidance, said method comprising the steps of:

storing route information required to reach a destination, said route information including information of a branch point on a road being traveled by said vehicle to be an object of said voice guidance;

detecting a number of lanes in said road being traveled;

calculating a position for issuing said voice guidance before said vehicle reaches said branch point in accordance with said detected number of lanes, said calculating step including calculating said position for issuing said voice guidance at a position which is increasingly further away from said branch point as said detected number of lanes increases; and issuing said voice guidance at said position for issuing said voice guidance.

5. A navigation method for carrying out a navigation of a vehicle utilizing a voice guidance, said method comprising the steps of:

storing route information required to reach a destination, said route information including information of a branch point on a road being traveled by said vehicle to be an object of said voice guidance;

detecting a width of a crossroad intersecting said road being traveled at said branch point;

calculating a position for issuing said voice guidance before said vehicle reaches said branch point in accordance with said detected width of said crossroad, said calculating step including calculating said position for issuing said voice guidance at a position which is increasingly further away from said branch point as said detected road width increases; and issuing said voice guidance at said position for issuing said voice guidance.

6. A navigation method according to claim 5, wherein said step of detecting said width of said crossroad is performed on a basis of a number of lanes in said crossroad.

7. A navigation method for carrying out a navigation of a vehicle utilizing a voice guidance, said method comprising the steps of:

storing route information required to reach a destination;

selecting a branch point to be a subject of said voice guidance on a basis of said route information;

calculating a first position of a predetermined distance before said selected branch point relative to a direction in which said vehicle is traveling on a road;

detecting a number of lanes in said road being traveled;

changing said first position to a corrected position which is increasingly further away from said selected branch point as said detected number of lanes increases; and issuing said voice guidance at said corrected position.

8. A navigation method for carrying out a navigation of a vehicle utilizing a voice guidance, said method comprising the steps of:

storing route information required to reach a destination;

selecting a branch point to be a subject of said voice guidance on a basis of said route information;

calculating a first position of a predetermined distance before said selected branch point relative to a direction in which said vehicle is traveling on a road;

detecting a width of a crossroad intersecting said road being traveled at said selected branch point;

changing said first position to a corrected position which is increasingly further away from said selected branch point as said detected road width increases; and issuing said voice guidance at said corrected position.

9. A navigation method according to claim 8, wherein said width of said crossroad is calculated on a basis of a number of lanes in said crossroad being traveled.

* * * * *